United States Patent [19]

Pere

[11] 4,379,044

[45] Apr. 5, 1983

[54] INSTALLATION FOR DEGASSING AND RECYCLING THE ELECTROLYTE IN AN ELECTROLYZER FOR PRODUCING GAS

[75] Inventor: Gerard Pere, Le Breuil, France

[73] Assignee: Creusot-Loire, Paris, France

[21] Appl. No.: 279,286

[22] Filed: Jun. 30, 1981

[30] Foreign Application Priority Data

Jul. 22, 1980 [FR] France ................. 80 16106

[51] Int. Cl.³ .................. C25B 9/00; C25B 15/08; C25B 1/02
[52] U.S. Cl. .................. 204/237; 204/256; 204/258; 204/266; 204/270; 204/129
[58] Field of Search .............. 204/256, 258, 266, 270, 204/129, 237

[56] References Cited

U.S. PATENT DOCUMENTS

| | | | |
|---|---|---|---|
| 3,928,165 | 12/1975 | Piester | 204/256 X |
| 3,968,021 | 7/1976 | Rahn et al. | 204/256 |
| 4,294,683 | 10/1981 | Pere | 204/258 |
| 4,323,442 | 4/1982 | Lantin et al. | 204/258 X |

*Primary Examiner*—Donald R. Valentine

*Attorney, Agent, or Firm*—Pollock, Vande Sande & Priddy

[57] ABSTRACT

Electrolysis return circuit for an electrolysis installation, e.g. for electrolysis of pressurized water.

Passage is provided from the anolyte outlet (1) to the anolyte inlet (3) via a direct transfer circuit (9) equipped with a crude degasser (10) and transferring the portion $$\frac{A^2}{A+C}$$

of the anolyte flow A, C being the catholyte flow, and via a circuit (7) equipped with a thorough degasser (8) and transferring, from the catholyte outlet (2) a flow $$C \times \frac{A}{A+C},$$

and vice versa to pass from the catholyte outlet (2) to the catholyte inlet (4).

1 Claim, 1 Drawing Figure

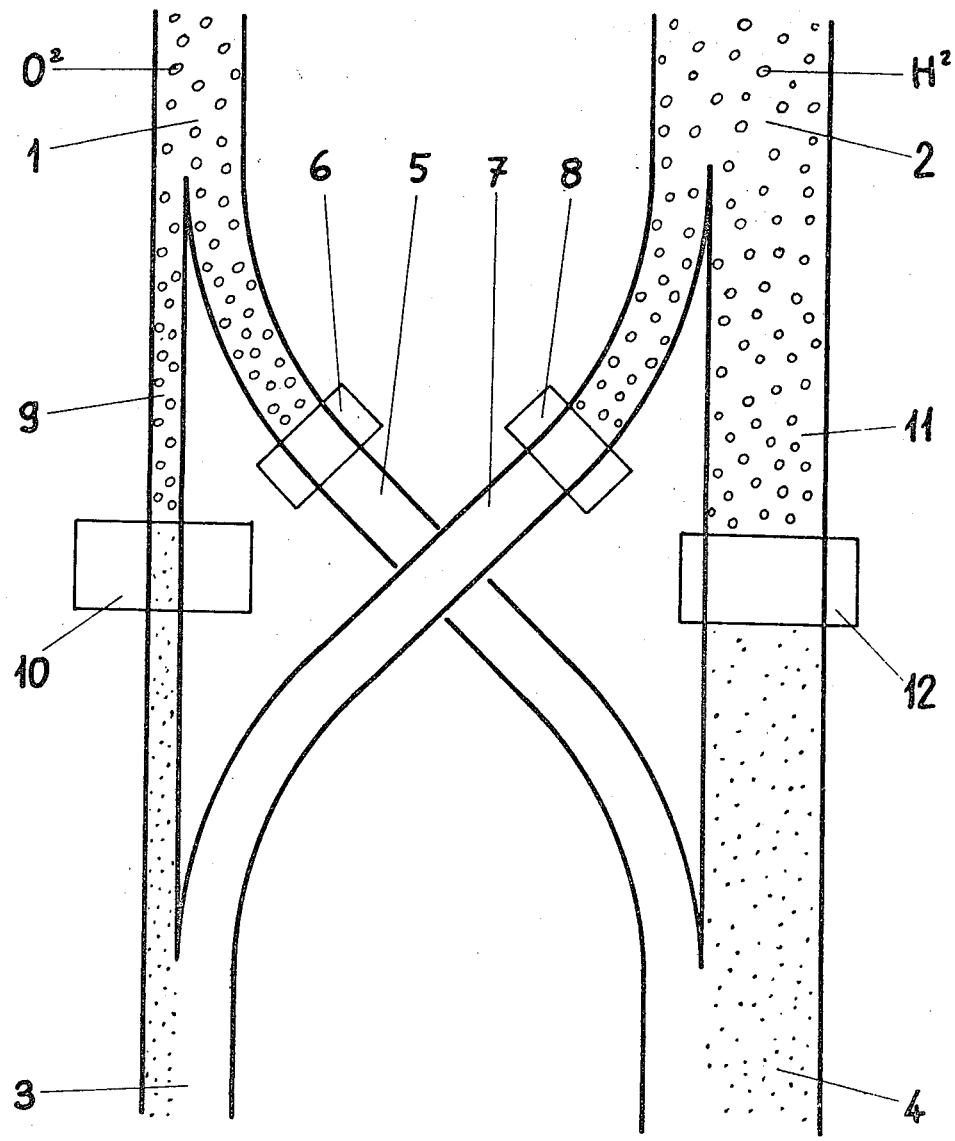

INSTALLATION FOR DEGASSING AND RECYCLING THE ELECTROLYTE IN AN ELECTROLYZER FOR PRODUCING GAS

The present invention concerns an electrolysis installation, such as, for example, an installation for the industrial production of hydrogen and oxygen by electrolysis of pressurized water.

In currently known electrolysis installations, for example as described in the French patent application filed by applicant on Apr. 2, 1979 under No. 79 08694, the anolyte and catholyte return circuits originating from separators are connected in one and the same pipe system, permitting equal potash densities at the inlet of the electrolyser to be obtained on the anodic side and on the cathodic side. This combining of the degassed electrolyte return circuits, by assuring equal potash densities at each of the two inlets of the electrolyser, prevents a drop in the yield of the electrolyzer, as it operates due to the increase in the density of potash on the cathodic side and the correlative decrease of this on the anodic side. It is in fact known that the electrolysis reaction causes a loss of potash and a gain in water on the anode side, and vice versa on the cathode side; the resistivity of the electrolyte is a function of the potash density of this, and increases if there is a substantial deviation to either side of the optimum density. To operate with a good yield, it is therefore essential always to keep the potash densities at the inlets of the electrolyser near the optimum density corresponding to the minimum of resistivity in the electrolyte mixture.

With known installations, to avoid risks of explosion following possible mixing of hydrogen gas and oxygen, it is essential for them to be equipped with very efficient liquid-gas separators, these having to degas the whole of the electrolyte flow in circulation. Such degassers take up a considerable amount of space and are expensive, and it is desirable to be able to equip the electrolysis installation with less sophisticated degassing apparatuses.

The present invention concerns a new type of electrolysis installation which, while operating with optimum yield like installations cited hereinbefore, does not have their disadvantages, being able to be partially equipped with simpler degassers and at all events with degassers which take up less space. Such an installation is of the type comprising an electrolyser with an anolyte outlet with flow A, the said anolyte being charged there with bubbles of the gas due to the electrolysis reaction on the anode side, and with a catholyte outlet with flow C, the said catholyte being charged there with bubbles of gas due to the electrolysis reaction on the cathode side, the said electrolyser also being provided with an anolyte inlet with the same flow A as at the said anolyte outlet and a catholyte inlet with the same flow C as at the said catholyte outlet, and its electrolyte return circuit located between the said electrolyser inlets and said electrolyser outlets comprises: (a) a circuit for transferring a portion $$A \times \frac{C}{A + C}$$

of the anolyte flow A from the anolyte outlet to the catholyte inlet, the said transfer circuit being equipped with a liquid-gas separator for thorough degassing. (b) a circuit for transferring a portion $$C \times \frac{A}{A + C}$$

of the catholyte flow C from the catholyte outlet to the anolyte inlet, the said transfer circuit also being equipped with a liquid-gas separator for thorough degassing. (c) a circuit for transferring the remaining portion $$\frac{A^2}{A + C}$$

of the anolyte flow A from the anolyte outlet to the anolyte inlet, the said circuit being equipped with a liquid-gas separator for crude degassing. (d) a circuit for transferring the remaining portion $$\frac{A^2}{A + C}$$

of the catholyte flow C from the catholyte outlet to the catholyte inlet, the said circuit being equipped with a liquid-gas separator for crude degassing.

The invention will be better understood by means of the following description of an embodiment applied to an installation for the industrial production of hydrogen and oxygen by electrolysis of pressurized water, with reference to the single attached FIGURE representing the electrolyte return circuit diagrammatically.

In the FIGURE, reference numeral 1 designates the anolyte outlet of the electrolyser, charged with bubbles of oxygen $o^2$, and reference numeral 2 its catholyte outlet charged with bubbles of hydrogen $H^2$. As is conventional for the electrolysis of water, the catholyte flow C and the anolyte flow A are in the ratio ($\frac{2}{3}$–$\frac{1}{3}$) of the total electrolyte flow as symbolised diagrammatically by corresponding thicknesses of pipe in the drawing, in which the anolyte flow A is represented diagrammatically by a pipe thickness of 1.5 cm while the catholyte flow C is represented diagrammatically by a pipe thickness of 3 cm (the total electrolyte flow will therefore pass into a pipe thickness equivalent to 4.5 cm.) Also in the FIGURE, reference numerals 3 and 4 designate the anolyte and catholyte inlets, also passing the flows A and C. In accordance with the invention, passage is provided from the anolyte outlet 1 and the catholyte outlet 2 to the anolyte inlet 3 and the catholyte inlet 4 of the electrolyser via the following circuits:

(a) a circuit 5 transferring, from the anolyte outlet 1 to the catholyte inlet 4, a portion $$A \times \frac{C}{A + C}$$

of the anolyte flow A, the said transfer circuit 5 being equipped with a degasser 6 for thorough degassing, for example allowing bubbles of gas to a diameter of 5 to 10 microns to be separated, such as, for example, a liquid-gas separator described in French Patent Application No. 79 03550. In the example represented diagrammatically in the figure, the anolyte flow thus transferred is then represented, symbolically, by a pipe of a width equal to 1 cm.

(b) a circuit 7 transferring, from the catholyte outlet 2 to the anolyte inlet 3, a portion $$C \times \frac{A}{A+C}$$

of the catholyte flow C, the said transfer circuit 7 also being equipped with a degasser 8 for thorough degassing, identical to the degasser 6. As previously, the catholyte flow thus transferred is represented diagrammatically on the FIGURE by a pipe of a width equal to 1 cm.

(c) a circuit 9 transferring, from the anolyte outlet 1 to the anolyte inlet 3, the remaining portion $$A - \frac{A \cdot C}{A+C} = \frac{A^2}{A+C}$$

of the anolyte flow A, the said circuit 9 being equipped with a degasser 10 for crude degassing, only separating larger bubbles from the gas-liquid mixture, for example those of a diameter exceeding 30 to 50 microns.

Such a degasser can be constituted, for example, by the degasser according to French Pat. No. 79 03550 previously cited, in which the stacks of plates have been raised to leave only the vertical screen positioned immediately at the inlet of the cylinder constituting the casing of the degasser. In the example represented diagrammatically in the FIGURE, the flow $$\frac{A^2}{A+C}$$

thus transferred by the circuit 9 is then represented by a pipe of a thickness equal to 0.5 cm. (a) a circuit 11 transferring, from the catholyte outlet 2 to the catholyte inlet 4, the remaining portion $$C - \frac{A \cdot C}{A+C} = \frac{C^2}{A+C}$$

of the catholyte flow C, the said circuit 11 also being equipped with a degasser 12 for crude degassing, of the same type as the degasser 10, but capable of passing the flow $$\frac{C^2}{A+C}$$

concerned. In the example represented diagrammatically in the FIGURE, the flow $$\frac{C^2}{A+C}$$

thus transferred by the circuit 11 is then represented, symbolically, by a pipe of a thickness equal to 2 cm.

It can then be established that, by means of the apparatus of the invention, the electrolyte injected into the electrolyser at 3 and at 4 is constituted by a mixture in the proportion (⅓-⅔), i.e. (A/C) of the anolyte flow A and the catholyte flow C at the outlets (1, 2) of the electrolyser.

The FIGURE in fact shows exactly that the anolyte-inlet side electrolyte 3 is represented, in the symbolism used, by a flow with a total width of 1.5 cm formed by 0.5 cm of anolyte originating from the outlet 1 and 1 cm of catholyte originating from the outlet 2, while the catholyte-inlet side electrolyte 4 is there, symbolically, represented by a flow of a total width of 3 cm formed by 1 cm of anolyte originating from the outlet 1 and 2 cm of catholyte originating from the outlet 2; there is therefore correctly a ratio of (⅓-170) between the amounts of anolyte and catholyte.

It can also be calculated that, generally, at the outlet of the electrolyser, the proportion of electrolyte is formed by an outlet anolyte-catholyte mixture in the ratio A/C of the anolyte flow A and catholyte flow C leaving the electrolyser.

In fact the said anolyte-catholyte ratio equals $$\frac{A^2}{A+C} : \frac{A \times C}{A+C} = \frac{A}{C} \text{ for the anolyte inlet and}$$

$$\frac{A \times C}{A+C} : \frac{C^2}{A+C} = \frac{A}{C} \text{ for the catholyte inlet.}$$

The invention produces a result similar to that obtained with the apparatuses of the prior art, but instead of using degassers for thorough degassing and high flow, two degassers for thorough degassing but lower flow and two crude degassers with partial flow are used here, so that the cost of the installation is ultimately reduced.

I claim:

1. Electrolysis installation for producing gas, of the type comprising an electrolyser having an anolyte outlet (1) with flow A, the said anolyte being charged there with bubbles of the gas ($O^2$) due to the electrolysis reaction on the anode side, and a catholyte outlet (2) with flow C, said catholyte being charged there with bubbles of the gas ($H^2$) due to the electrolysis reaction on the cathode side, said electrolyser also being provided with an anolyte inlet (3) with the same flow A as at said anolyte outlet and with a catholyte inlet (4) with the same flow C as at said catholyte outlet, an electrolyte return circuit being provided between said electrolyser inlets and said electrolyser outlets and comprising (a) a circuit (5) for transferring a portion $$A \times \frac{C}{A+C}$$

of the anolyte flow A from said anolyte outlet (1) to said catholyte inlet (4), said transfer circuit being equipped with a liquid-gas separator (6) for thorough degassing;

(b) a circuit (7) for transferring a portion $$C \times \frac{A}{A+C}$$

of the catholyte flow C from said catholyte outlet (2) to said anolyte inlet (3), said transfer circuit also being equipped with a liquid-gas separator (8) for thorough degassing;

(c) a circuit (9) for transferring the remaining $$\frac{A^2}{A+C}$$

of the anolyte flow A from said anolyte outlet (1) to said anolyte inlet (3), said circuit being equipped with a liquid-gas separator (10) for crude degassing; and (d) a circuit (11) for transferring the remaining portion $$\frac{C^2}{A+C}$$

of the catholyte flow C from said catholyte outlet (2) to said catholyte inlet (4), said circuit being equipped with a liquid-gas separator (12) for crude degassing.

* * * * *